United States Patent Office 2,835,671
Patented May 20, 1958

2,835,671

PYRIDAZINE DERIVATIVES

Alexander Staehelin, Basel, Switzerland, assignor to Ciba Pharmaceutical Products, Inc., Summit, N. J.

No Drawing. Application May 11, 1954
Serial No. 429,101

Claims priority, application Switzerland May 12, 1953

5 Claims. (Cl. 260—250)

This invention relates to esters of 1,4-dihydro-4-oxo-1-phenyl-6- lower alkyl-pyridazine-3-carboxylic acids unsubstituted in the 5-position. The phenyl residue of these esters may contain further substituents, for example, alkyl, alkoxy, nitro or carbalkoxy groups, or halogen atoms.

This invention relates more particularly to esters of 1,4-dihydro-4-oxo1-phenyl-6- lower alkyl-pyridazine-3-carboxylic acids unsubstituted in the 5-position with alcohols containing 1–10 carbon atoms, such as alkanols, for example methanol, ethanol or propanol, oxa-alkanols, for example, 3-oxa-butanol, 3-oxa-pentanol, 3,6-dioxaheptanol; aza-alkanols, for example, 3-methyl-3-aza-butanol, 3-ethyl-3-aza-pentanol, 4-methyl-4-aza-pentanol, 4-ethyl-4-aza-hexanol and 3-butyl-3-aza-heptanol. A lower alkyl residue is for example methyl, ethyl or propyl.

The invention is especially concerned with esters of the formula

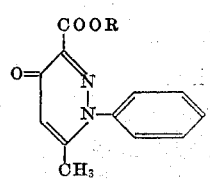

in which R represents a lower alkyl residue, preferably an alkyl residue containing at the most two carbon atoms, that is to say, the methyl and ethyl esters of 1,4-dihydro-4-oxo-6-methyl-1-phenyl-pyridazine-3-carboxylic acid.

Compounds comprising the invention possess valuable pharmacological properties. Thus, they exhibit a stimulating action on the central nervous system, and are useful as medicaments for stimulating that system. The free acids, on the other hand, do not exhibit an analeptic activity.

The new esters are made advantageously by reacting a 1,4-dihydro-4-oxo-1-phenyl-6-lower alkyl-pyridazine-3-carboxylic acid or a reactive functional derrivative or salt thereof with an alcohol or a reactive derivative of an alcohol, such as a metal alcoholate or a reactive ester thereof, preferably one derived from a strong inorganic or organic acid, particularly a hydrohalic acid or by reacting the carboxylic acid with an appropriate organic diazo-compound.

The reactions are carried out in the presence or absence of a diluent and/or a catalyst or condensing agent, at ordinary or a raised temperature, in an open vessel or in a closed vessel under superatmospheric pressure.

The new compounds can beused as medicaments, for example, in the form of pharmaceutical preparations which contain them in admixture with a pharmaceutical organic or inorganic carrier material suitable for enteral, parenteral or local application. For the production of these preparations such substances are concerned as do not react with the new compounds, so for example water, gelatine, lactose, starch, magnesium stearate, talc, vegetable oils, benzyl alcohols, gums, polyalkylene glycols, Vaseline, cholesterol, or other known medicament carriers. The pharmaceutical preparations can take the form of, for example, tablets, dragees, salves, creams, or are in liquid form as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are formulated by the usual methods.

The following examples illustrate the invention, the parts being by weight unless otherwise stated, and the relationship of parts by weight to parts by volume being the same as that of the gram to the cubic centimeter:

Example 1

20 parts of 1,4-dihydro-4-oxo-6-methyl-1-phenyl-pyridazine-3-carboxylic acid are heated on a water bath in 80 parts by volume of methanol and 20 parts by volume of concentrated sulfuric acid for 7–8 hours. The cooled solution is then poured on to 400 parts by volume of a mixture of ice and water. The whole is then allowed to stand and after a short time the crystalline precipitate is filtered off with suction. The resulting methyl ester of 1,4 - dihydro - 4 - oxo - 6 - methyl - 1 - phenyl - pyridazine-3-carboxylic acid of the formula

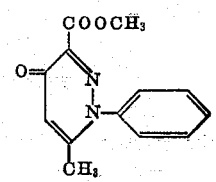

melts at 209–210° C. after recrystallization from a mixture of methanol and water.

Example 2

20 parts of 1,4-dihydro-4-oxo-6-methyl-1-phenyl-pyridazine-3-carboxylic acid are heated on the water bath in 80 parts by volume of absolute ethanol and 20 parts by volume of concentrated sulfuric acid for 8 hours. After being cooled, the solution is poured on to 400 parts by volume of a mixture of ice and water. The whole is then allowed to stand and after a short time the yellow-white precipitate is filtered off with suction. The resulting ethyl ester of 1,4-dihydro-4-oxo-6-methyl-1-phenyl-pyridazine-3-carboxylic acid of the formula

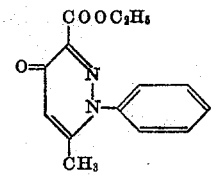

melts at 181–182° C. after recrystallization from ethanol.

Example 3

5 parts of 1,4-dihydro-4-oxo-6-methyl-1-phenyl-pyridazine-3-carboxylic acid are heated under reflux on an oil bath at 130–140° C. for 10 hours with 20 parts by volume of n-butanol and 2.5 parts by volume of concentrated sulfuric acid. The mixture is cooled and poured on to 100 parts by volume of a mixture of ice and water. The whole is allowed to stand for a short time and the brownish products is filtered off with suction. It is dried, stirred in the cold in a dilute solution of sodium carbonate and extracted with ethyl acetate. The dried ethyl acetate solution is evaporated. There remains behind a crystalline residue which is recrystallized from absolute ethanol. There is obtained the n-butyl ester of 1,4-dihydro-4-oxo-6-methyl-1-phenyl-pyridazine-3-carboxylic acid of the formula

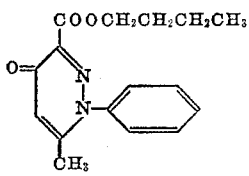

in the form of white crystals melting at 151–152° C.

*Example 4*

10 parts of 1,4-dihydro-4-oxo-6-methyl-1-phenyl-pyridazine-3-carboxylic acid are heated in a fusion tube with 40 parts by volume of isopropanol and 5 parts of concentrated sulfuric acid for 6 hours at 110–120° C. The mixture is then cooled and poured on to 200 parts by volume of a mixture of ice and water. The mixture is extracted by shaking it with ethyl acetate, and the organic solution is washed with sodium carbonate solution and evaporated. A crystalline residue remains behind, which is recrystallized from absolute ethanol with the addition of animal carbon. There is obtained the isopropyl ester of 1,4-dihydro-4-oxo-6-methyl-1-phenyl-pyridazine-3-carboxylic acid of the formula

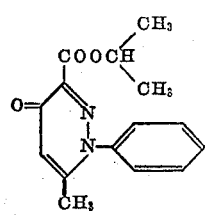

in the form of white crystals melting at 184–185° C.

*Example 5*

5 parts of 1,4-dihydro-4-oxo-6-methyl-1-phenyl-pyridazine-3-carboxylic acid are boiled under reflux on an oil bath at 115–125° C. for 10 hours with 20 parts by volume of n-propanol and 2.5 parts by volume of concentrated sulfuric acid. The mixture is poured on to 100 parts by volume of a mixture of ice and water, whereupon crystallization occurs. The mixture is then filtered with suction and the filter residue is stirred with sodium carbonate solution. The ester is extracted from the alkaline solution with ethyl acetate. The ethyl acetate solution is dried and evaporated. A grey-white residue remains behind, which is recrystallized from absolute ethanol. There is obtained the n-propyl ester of 1,4 - dihydro - 4 - oxo - 6 - methyl - 1 - phenyl - pyridazine-3-carboxylic acid of the formula

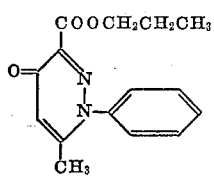

in the form of white crystals melting at 146–147° C.

*Example 6*

5 parts of 1,4-dihydro-4-oxo-6-methyl-1-phenyl-pyridazine-3-carboxylic acid are saturated in 50 parts by volume of iso-butanol with hydrochloric acid (46%), allowed to stand overnight, and then heated for 2 hours on the water bath. The hot solution is filtered to remove some undissolved material and the filtrate is cooled, whereupon the product crystallizes immediately. It is allowed to stand for some time and then suction-filtered. The residue is triturated in a mortar with sodium carbonate solution, suction-filtered, dissolved in hot water, the solution filtered through animal charcoal, and cooled. The crystallizate is suction-filtered. There is thus obtained the 1,4-dihydro-4-oxo-6-methyl-1-phenyl-pyridazine-3-carboxylic acid-isobutyl ester of the formula

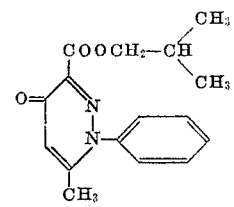

in the form of white crystals melting at 122–123° C.

*Example 7*

10 parts of 1,4-dihydro-4-oxo-6-methyl-1-phenyl-pyridazine-3-carboxylic acid are boiled under reflux for 20 hours in a flask fitted with stirring means with 6.5 parts of β-diethylaminoethyl chloride, 5 parts by volume of water, 2.5 parts of sodium carbonate and 250 parts by volume of acetone. The crystallizate is filtered off with suction after cooling and washed with acetone. The acetone solution is evaporated and the free base obtained as a crystalline brown residue is dissolved hot in absolute ethanol and a 2 N-solution of hydrochloric acid in ethyl alcohol. The solution is treated with animal carbon while hot, filtered, and by the addition of absolute ether the hydrochloride of the (3'-ethyl-3-aza-pentyl) ester of 1,4 - dihydro - 4 - oxo - 6 - methyl - 1 - phenyl - pyridazine-3-carboxylic acid of the formula

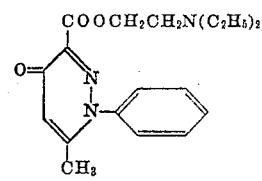

is caused to crystallize. After recrystallization from absolute ethanol with the addition of absolute ether, the product melts at 206–207° C. (with decomposition). From the above described base there can be obtained in the usual manner by reacting it with acids appropriate for the formation of non-toxic, therapeutically useful salts the corresponding salts. Such acids are for example hydrohalic acids, sulfuric acid, phosphoric acid, nitric acid, methane sulfonic acid, acetic acid, tartaric acid, citric acid or benzoic acid.

*Example 8*

15 parts of 1,4-dihydro-4-oxo-6-methyl-1-phenyl-pyridazine-3-carboxylic acid are heated to 145–150° C. under reflux for 10 hours on an oil bath with 75 parts by volume of 1-hydroxy-3-oxa-butane and 9 parts by volume of concentrated sulfuric acid. The mixture is cooled and poured on to 300 parts by volume of a mixture of ice and water. The whole is allowed to stand for some time and the precipitated product then suction-filtered. It is then dissolved in a solution of sodium carbonate and extracted with ethyl acetate. The ethyl acetate solution is dried and evaporated. A grey-white residue remains behind which is dissolved in benzene, filtered through animal charcoal and crystallized by the addition of absolute ether. There is thus obtained the 1,4 - dihydro - 4 - oxo - 6 - methyl - 1 - phenyl - pyridazine-3-carboxylic acid-3'-oxabutyl ester of the formula

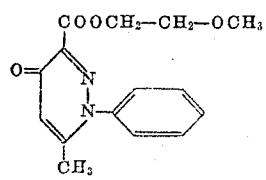

in the form of white crystals of melting point 158–160° C.

Example 9

15 parts of 1,4-dihydro-4-oxo-6-methyl-1-phenyl-pyridazine-3-carboxylic acid are heated to 145–150° C. under reflux for 10 hours on an oil bath in 75 parts by volume of 1-hydroxy-3-oxapentane and 9 parts by volume of concentrated sulfuric acid. The mixture is then cooled and poured on to 300 parts by volume of a mixture of ice and water. The whole is allowed to stand for some time and the precipitated product separated by suction-filtering. It is then dissolved in a solution of sodium carbonate and extracted with ethyl acetate. The dried ethyl acetate solution is evaporated. There remains a residue which, after being dissolved in benzene, is filtered through animal charcoal and recrystallized by the addition of absolute ether. There is thus obtained the 1,4-dihydro-4-oxo-6-methyl-1-phenyl-pyridazine-3-carboxylic acid-3'-oxapentyl ester of the formula

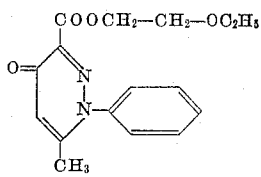

in the form of white crystals of melting point 131–132° C.

Example 10

12 parts of 1,4-dihydro-4-oxo-6-methyl-1-(4'-nitro-phenyl)-pyridazine-3-carboxylic acid are heated under reflux for 10 hours on the water bath with 60 parts by volume of absolute ethanol and 12 parts by volume of concentrated sulfuric acid. The mixture is cooled and poured on to 600 parts by volume of a mixture of ice and water. The whole is allowed to stand for some time and the precipitated product separated by suction-filtering. It is then triturated in a mortar with a solution of sodium carbonate, suction-filtered, dissolved in hot ethanol, the solution filtered through animal charcoal, and cooled, whereupon crystallization sets in. There is thus obtained the 1,4-dihydro-4-oxo-6-methyl-1-(4'-nitro-phenyl)-pyridazine-3-carboxylic acid ethyl ester of the formula

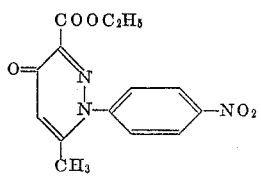

in the form of slightly yellow crystals of melting point 161–162° C.

Example 11

12 parts of 1,4-dihydro-4-oxo-6-methyl-(3'-nitro-phenyl)-pyridazine-carboxylic acid are heated under reflux for 10 hours on the water bath in 60 parts by volume of absolute ethanol and 12 parts by volume of concentrated sulfuric acid. The mixture is cooled and poured on to 600 parts by volume of a mixture of ice and water. The aqueous solution is then extracted with ethyl acetate. The organic solution is washed with sodium carbonate solution, dried over sodium sulfate, and evaporated. There remains a dark residue which is dissolved in hot dilute ethanol. The solution is filtered through animal charcoal and cooled for crystallization. There is thus obtained the 1,4-dihydro-4-oxo-6-methyl-1-(3'-nitro-phenyl)-pyridazine-3-carboxylic acid-ethyl ester of the formula

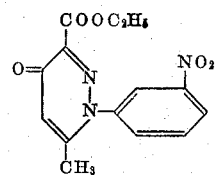

in the form of yellow crystals of melting point 183–184° C.

Example 12

14 parts of 1,4-dihydro-4-oxo-6-methyl-1-(4'-carboxy-phenyl)-pyridazine-3-carboxylic acid are heated under reflux on the water bath for 6 hours in 60 parts by volume of absolute ethanol and 10 parts by volume of concentrated sulfuric acid. The mixture is cooled and poured on to 320 parts by volume of a mixture of ice and water. The aqueous solution is then extracted with ethyl acetate. The organic solution is washed several times with sodium carbonate solution, dried over sodium sulfate and evaporated. There remains a brown residue which is dissolved in hot ethanol. The solution is filtered through animal charcoal and cooled, whereupon crystallization sets in. There is thus obtained the 1,4-dihydro-4-oxo-6-methyl-1-(4'-carbethoxy-phenyl)-pyridazine-3-carboxylic acid-ethyl ester of the formula

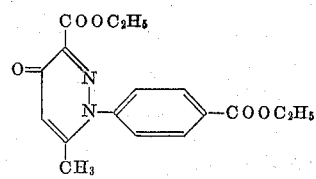

in the form of white crystals of melting point 156–157° C.

The 1,4-dihydro-4-oxo-6-methyl-1-(4'-carboxy-phenyl)-pyridazine-3-carboxylic acid used as starting material can be made as follows:

41 parts of para-aminobenzoic acid, 12.3 parts of sodium hydroxide and 20.7 parts of sodium nitrite are dissolved in 450 parts by volume of water and cooled to −5 to 0° C. To this solution, hydrochloric acid (105 parts by volume of concentrated hydrochloric acid mixed with 90 parts by volume of water) is added dropwise in the course of one hour while stirring at 0° C. This diazo solution is then introduced in portions, at 10° C., and with continued stirring into a solution of 37.8 parts of 6-methyl-pyronone, 45 parts of sodium carbonate solution and 600 parts by volume of water. After one hour the precipitated dyestuff is filtered off with suction, washed thoroughly and taken up in a dilute alkaline ethanol solution prepared from 30 parts of sodium hydroxide, 450 parts of ethanol and 600 parts by volume of water, and refluxed for one hour. The solution is then diluted with 1800 parts by volume of water, allowed to stand for half an hour, filtered through animal charcoal and acidified with hydrochloric acid. The yellow-brown precipitate is suction-filtered, washed and dried. There is thus obtained the 1,4-dihydro-4-oxo-6-methyl-1-(4'-carboxy-phenyl)-pyridazine-3-carboxylic acid which decomposes above 300° C.

Example 13

10 parts of 1,4-dihydro-4-oxo-6-methyl-1-(4'-bromo-phenyl)-pyridazine-3-carboxylic acid are refluxed on the water bath for 10 hours with 100 parts by volume of absolute ethanol and 5 parts by volume of concentrated sulfuric acid. The mixture is cooled and poured on to 200 parts of ice. The whole is allowed to stand for some time and the solution then extracted by shaking with ethyl acetate. The organic solution is washed with a dilute sodium carbonate solution and the ethyl acetate solution dried and evaporated. The brown crystalline residue is dissolved in ethanol and filtered through animal charcoal. On the addition of absolute ether the 1,4-dihydro-4-oxo-6-methyl-1 - (4' - bromophenyl) - pyridazine-3-carboxylic acid ethyl ester of the formula

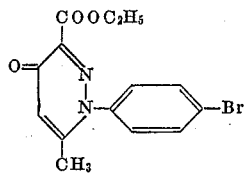

forms white crystals of melting point 145–146° C.

The carboxylic acid used as starting material can be prepared as follows:

34.4 parts of para-bromaniline are dissolved in 150 parts by volume of water and 50 parts by volume of concentrated hydrochloric acid and cooled to —5–0° C. while stirring. A solution of 13.8 parts of sodium nitrite in 90 parts by volume of water is then added dropwise at 0° C. and the resulting diazo solution added in portions to a solution of 25.2 parts of 6-methyl-pyronone, 25.2 parts of sodium carbonate and 500 parts by volume of water at 10° C. while stirring. The mixture is diluted with 1000 parts by volume of water and stirred for another hour, then the precipitated dyestuff separated by filtering with suction and washed well. The residue is refluxed on the water bath for 3–4 hours in an alkaline ethanol solution consisting of 10 parts of sodium hydroxide, 300 parts by volume of ethanol and 400 parts by volume of water. The mixture is then poured on to 1500 parts by volume of water, allowed to stand for an hour and a half, then filtered through animal charcoal, acidified with hydrochloric acid and suction-filtered. The residue is washed and dried. There is thus obtained the 1,4-dihydro-4-oxo-6-methyl - 1 - (4' - bromophenyl)-pyridazine-3-carboxylic acid which after recrystallization from ethyl acetate has a decomposition point of 251–253° C.

*Example 14*

5 parts of 1,4-dihydro-4-oxo-6-methyl-1-phenyl-pyridazine-3-carboxylic acid are dissolved warm in 30 parts by volume of methanol. The cooled solution is then mixed with an excess of diazo methane in ethereal solution. After having been allowed to stand for several hours, the solution is evaporated to one half, cooled and the precipitate suction-filtered and dried. After recrystallization from methanol there is obtained the 1,4-dihydro-4-oxo-6-methyl-1-phenyl-pyridazine-3-carboxylic acid methyl ester described in Example 1 in the form of white needles of melting point 209–210° C.

What is claimed is:

1. Esters of 1,4-dihydro-4-oxo-1-R-6-lower alkyl-pyridazine-3-carboxylic acid with an alcohol selected from the group consisting of lower alkanols, 3-oxa-alkanols, 3-aza-alkanols and 4-aza-alkanols, said alcohols containing at most 10 carbon atoms, wherein R stands for a member selected from the group consisting of phenyl, lower alkylphenyl, lower alkoxy-phenyl, nitro-phenyl and lower carbalkoxy-phenyl.

2. Esters of the formula

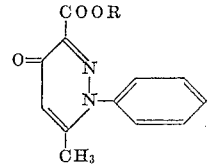

wherein R stands for a lower alkyl.

3. Esters of the formula shown in claim 2, wherein R stands for an alkyl residue with at the most two carbon atoms.

4. Methyl ester of 1,4-dihydro-4-oxo-6-methyl-1-phenyl-pyridazine-3-carboxylic acid.

5. Ethyl ester of 1,4-dihydro-4-oxo-6-methyl-1-phenyl-pyridazine-3-carboxylic acid.

References Cited in the file of this patent

UNITED STATES PATENTS 2,454,742  Morgan _____ Nov. 23, 1948

OTHER REFERENCES

Sonn et al.: Liebig's Annalen, 518, 290–298 (1935).
Beilstein, Vierte auflage, vol. 25, pages 219–220.